United States Patent
Arling et al.

(10) Patent No.: US 7,000,933 B2
(45) Date of Patent: *Feb. 21, 2006

(54) METHOD FOR ATTACHING A CARRIER TO A BALANCING TRANSPORTER

(75) Inventors: R. William Arling, Windham, NH (US); J. Douglas Field, Bedford, NH (US); John David Heinzmann, Manchester, NH (US); Jeffrey W. Hill, Brookline, NH (US); Michael Slate, Merrimack, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 39 days.

This patent is subject to a terminal disclaimer.

(21) Appl. No.: 10/626,468

(22) Filed: Jul. 24, 2003

(65) Prior Publication Data

US 2004/0129464 A1    Jul. 8, 2004

Related U.S. Application Data

(60) Continuation-in-part of application No. 10/164,333, filed on Jun. 5, 2002, now abandoned, which is a division of application No. 09/516,384, filed on Mar. 1, 2000, now Pat. No. 6,435,535.

(51) Int. Cl.
*B62K 27/00* (2006.01)

(52) U.S. Cl. .................. 280/204; 280/492; 280/458; 180/218

(58) Field of Classification Search ............. 180/218; 280/204, 292, 492, 494, 504, 400
See application file for complete search history.

(56) References Cited

U.S. PATENT DOCUMENTS

| 584,127 A | 6/1897 | Draullette et al. |
| 849,270 A | 4/1907 | Schafer et al. |
| 1,739,716 A | 12/1929 | Fisher |

(Continued)

FOREIGN PATENT DOCUMENTS

DE    2 048 593    5/1971

(Continued)

OTHER PUBLICATIONS

Kawaji, S., *Stabilization of Unicycle Using Spinning Motion, Denki Gakkai Ronbushi, D.* Vol. 107, Issue 1, Japan (1987), pp. 1-22.

(Continued)

*Primary Examiner*—J. Allen Shriver
(74) *Attorney, Agent, or Firm*—Bromberg & Sunstein LLP

(57) ABSTRACT

A method for attaching a carrier, such as a trailer, to a dynamically balanced transporter. The carrier is attached to the transporter with a pivot. The pivot axis of the carrier is coincident with the axis of rotation of the wheels of the transporter. This method of attachment minimizes the impact of the trailer on the ability of the transporter to maintain dynamic balance and control.

8 Claims, 12 Drawing Sheets

U.S. PATENT DOCUMENTS

| | | | |
|---|---|---|---|
| 2,742,973 A | 4/1956 | Johannesen | |
| 3,145,797 A | 8/1964 | Taylor | |
| 3,260,324 A | 7/1966 | Suarez | |
| 3,283,398 A | 11/1966 | Andren | |
| 3,288,234 A | 11/1966 | Feliz | |
| 3,348,518 A | 10/1967 | Forsyth et al. | |
| 3,374,845 A | 3/1968 | Selwyn | |
| 3,399,742 A * | 9/1968 | Malick | 180/21 |
| 3,446,304 A | 5/1969 | Alimanestiano | |
| 3,450,219 A | 6/1969 | Fleming | |
| 3,515,401 A | 6/1970 | Gross | |
| 3,580,344 A | 5/1971 | Floyd | |
| 3,596,298 A | 8/1971 | Durst, Jr. | |
| 3,724,874 A | 4/1973 | Simpson | |
| 3,860,264 A | 1/1975 | Douglas et al. | |
| 3,872,945 A | 3/1975 | Hickman et al. | |
| 3,952,822 A | 4/1976 | Udden et al. | |
| 4,018,440 A | 4/1977 | Deutsch | |
| 4,062,558 A | 12/1977 | Wasserman | |
| 4,076,270 A | 2/1978 | Winchell | |
| 4,088,199 A | 5/1978 | Trautwein | |
| 4,094,372 A | 6/1978 | Notter | |
| 4,109,741 A | 8/1978 | Gabriel | |
| 4,111,445 A | 9/1978 | Haibeck | |
| 4,151,892 A | 5/1979 | Francken | |
| 4,222,449 A | 9/1980 | Feliz | |
| 4,264,082 A | 4/1981 | Fouchey, Jr. | |
| 4,266,627 A | 5/1981 | Lauber | |
| 4,293,052 A | 10/1981 | Daswick et al. | |
| 4,325,565 A | 4/1982 | Winchell | |
| 4,354,569 A | 10/1982 | Eichholz | |
| 4,363,493 A | 12/1982 | Veneklasen | |
| 4,373,600 A | 2/1983 | Buschbom et al. | |
| 4,375,840 A | 3/1983 | Campbell | |
| 4,510,956 A | 4/1985 | King | |
| 4,560,022 A | 12/1985 | Kassai | |
| 4,566,707 A | 1/1986 | Nitzberg | |
| 4,570,078 A | 2/1986 | Yashima et al. | |
| 4,571,844 A | 2/1986 | Komasaku et al. | |
| 4,624,469 A | 11/1986 | Bourne, Jr. | |
| 4,645,230 A | 2/1987 | Hammons | |
| 4,657,272 A | 4/1987 | Davenport | |
| 4,685,693 A | 8/1987 | Vadjunec | |
| 4,709,772 A | 12/1987 | Brunet | |
| 4,716,980 A | 1/1988 | Butler | |
| 4,740,001 A | 4/1988 | Torleumke | |
| 4,746,132 A | 5/1988 | Eagan | |
| 4,770,410 A | 9/1988 | Brown | |
| 4,786,069 A | 11/1988 | Tang | |
| 4,790,400 A | 12/1988 | Sheeter | |
| 4,790,548 A | 12/1988 | Decelles et al. | |
| 4,794,999 A | 1/1989 | Hester | |
| 4,798,255 A | 1/1989 | Wu | |
| 4,802,542 A | 2/1989 | Houston et al. | |
| 4,809,804 A | 3/1989 | Houston et al. | |
| 4,834,200 A | 5/1989 | Kajita | |
| 4,863,182 A | 9/1989 | Chern | |
| 4,867,188 A | 9/1989 | Reid | |
| 4,869,279 A | 9/1989 | Hedges | |
| 4,874,055 A | 10/1989 | Beer | |
| 4,890,853 A | 1/1990 | Olson | |
| 4,919,225 A | 4/1990 | Sturges | |
| 4,953,851 A | 9/1990 | Sherlock et al. | |
| 4,984,754 A | 1/1991 | Yarrington | |
| 4,985,947 A | 1/1991 | Ethridge | |
| 4,998,596 A | 3/1991 | Miksitz | |
| 5,002,295 A | 3/1991 | Lin | |
| 5,011,170 A * | 4/1991 | Forbes et al. | 280/204 |
| 5,011,171 A | 4/1991 | Cook | |
| 5,052,237 A | 10/1991 | Reimann | |
| 5,064,209 A * | 11/1991 | Kurschat | 280/204 |
| 5,111,899 A | 5/1992 | Reimann | |
| 5,158,493 A | 10/1992 | Morgrey | |
| 5,161,820 A | 11/1992 | Vollmer | |
| 5,168,947 A | 12/1992 | Rodenborn | |
| 5,171,173 A | 12/1992 | Henderson et al. | |
| 5,186,270 A | 2/1993 | West | |
| 5,221,883 A | 6/1993 | Takenaka et al. | |
| 5,240,266 A * | 8/1993 | Kelley et al. | 280/204 |
| 5,241,875 A | 9/1993 | Kochanneck | |
| 5,248,007 A | 9/1993 | Watkins et al. | |
| 5,314,034 A | 5/1994 | Chittal | |
| 5,350,033 A | 9/1994 | Kraft | |
| 5,366,036 A | 11/1994 | Perry | |
| 5,376,868 A | 12/1994 | Toyoda et al. | |
| 5,419,624 A | 5/1995 | Adler et al. | |
| 5,641,173 A * | 6/1997 | Cobb, Jr. | 280/204 |
| 5,655,615 A | 8/1997 | Mick | |
| 5,701,965 A | 12/1997 | Kamen et al. | |
| 5,701,968 A | 12/1997 | Wright-Ott et al. | |
| 5,718,534 A | 2/1998 | Neuling | |
| 5,775,452 A | 7/1998 | Patmont | |
| 5,791,425 A | 8/1998 | Kamen et al. | |
| 5,794,730 A | 8/1998 | Kamen | |
| 5,873,582 A | 2/1999 | Kaufman et al. | |
| 5,921,844 A | 7/1999 | Hollick | |
| 5,947,505 A | 9/1999 | Martin | |
| 5,971,091 A * | 10/1999 | Kamen et al. | 180/218 |
| 5,973,463 A | 10/1999 | Okuda et al. | |
| 5,975,225 A | 11/1999 | Kamen et al. | |
| 5,986,221 A | 11/1999 | Stanley | |
| 6,003,624 A | 12/1999 | Jorgensen et al. | |
| 6,039,142 A | 3/2000 | Eckstein et al. | |
| 6,050,357 A | 4/2000 | Staelin et al. | |
| 6,059,062 A | 5/2000 | Staelin et al. | |
| 6,125,957 A | 10/2000 | Kauffmann | |
| 6,131,057 A | 10/2000 | Tamaki et al. | |
| 6,223,104 B1 | 4/2001 | Kamen et al. | |
| 6,225,977 B1 | 5/2001 | Li | |
| 6,288,505 B1 | 9/2001 | Heinzmann et al. | |
| 6,302,230 B1 | 10/2001 | Kamen et al. | |
| 6,312,001 B1 * | 11/2001 | Boyer | 280/282 |
| 6,435,535 B1 * | 8/2002 | Field et al. | 280/204 |
| 2002/0063006 A1 | 5/2002 | Amesbury et al | |

FOREIGN PATENT DOCUMENTS

| | | |
|---|---|---|
| DE | 31 28 112 A1 | 2/1983 |
| DE | 32 42 880 A1 | 6/1983 |
| DE | 3411489 A1 | 10/1984 |
| DE | 44 04 594 A 1 | 8/1995 |
| DE | 196 25 498 C 1 | 11/1997 |
| DE | 298 08 091 U1 | 10/1998 |
| DE | 298 08 096 U1 | 10/1998 |
| EP | 0 109 927 | 7/1984 |
| EP | 0 193 473 | 9/1986 |
| EP | 0 537 698 A1 | 4/1993 |
| EP | 0663 313 A1 | 7/1995 |
| EP | 0 958 978 A2 | 11/1999 |
| FR | 980 237 | 5/1951 |
| FR | 2 502 090 | 3/1982 |
| GB | 152664 | 2/1922 |
| GB | 1213930 | 11/1970 |
| GB | 2 139 576 A | 11/1984 |
| JP | 52-44933 | 10/1975 |
| JP | 57-87766 | 6/1982 |
| JP | 57-110569 | 7/1982 |
| JP | 59-73372 | 4/1984 |
| JP | 62-12810 | 7/1985 |
| JP | 0255580 | 12/1985 |
| JP | 61-31685 | 2/1986 |
| JP | 63-305082 | 12/1988 |
| JP | 2-190277 | 7/1990 |
| JP | 4-201793 | 7/1992 |

| | | |
|---|---|---|
| JP | 6-171562 | 12/1992 |
| JP | 5-213240 | 8/1993 |
| JP | 6-105415 | 12/1994 |
| JP | 7255780 | 3/1995 |
| WO | WO 86/05752 | 10/1986 |
| WO | WO 89/06117 | 7/1989 |
| WO | WO 96/23478 | 8/1996 |
| WO | WO 98/46474 | 10/1998 |
| WO | WO 00 75001 A | 12/2000 |

OTHER PUBLICATIONS

Schoonwinkel, A., *Design and Test of a Computer-Stabilized Unicycle*, Stanford University (1988), UMI Dissertation Services.

Vos, D., *Dynamics and Nonlinear Adaptive Control of and Autonomous Unicycle*, Massachusetts Institute of Technology, 1989.

Vos, D., *Nonlinear Control of an Autonomous Unicycle Robot: Practical Isues*, Massachusetts Institute of Technology, 1992.

Koyanagi et al., *A Wheeled Inverse Pendulum Type Self-Contained Mobile Robot and its Posture Control and Vehicle Control*, The Society of Instrument and Control Engineers, Special issue of the 31st SICE Annual Conference, Japan 1992, pp. 13-16.

Koyanagi et al., *A Wheeled Inverse Pendulum Type Self-Contained Mobile Robot*, The Society of Instrument and Control Engineers, Special issue of the 31st SICE Annual Conference, Japan 1992, pp. 51-56.

Koyanagi et al., *A Wheeled Inverse Pendulum Type Self-Contained Mobile Robot and its Two Dimensional Trajectory Control*, Proceeding of the Second International Symposium on Measurement and Control in Robotics, Japan 1992, pp. 891-898.

Watson Industries, Inc., Vertical Reference Manual ADS-C132-1A, 1992, pp. 3-4.

News article *Amazing Wheelchair Goes Up and Down Stairs*.

Osaka et al., *Stabilization of unicycle, Systems and Control*, Vol. 25, No. 3, Japan 1981, pp. 159-166 (Abstract Only).

Roy et al., *Five-Wheel Unicycle System, Medical & Biological Engineering & Computing*, Vol. 23, No. 6, United Kingdom 1985, pp. 593-596.

Kawaji, S., *Stabilization of Unicycle Using Spinning Motion, Denki Gakkai Ronbushi, D*, Vol. 107, Issue 1, Japan 1987, pp. 21-28 (Abstract Only).

Schoonwinkel, A., *Design and Test of a Computer-Stabilized Unicycle, Dissertation Abstracts International*, Vol. 49/03-B, Stanford University 1988, pp. 890-1294 (Abstract only).

Vos et al., *Dynamics and Nonlinear Adaptive Control of an Autonomous Unicycle—Theory and Experiment, American Institute of Aeronautics and Astronautics*, A90-26772 10-39, Washington, D.C. 1990, pp. 487-494 (Abstract only).

TECKINCO'S Home Page, *Those Amazing Flying Machines*, http://www.swiftsite.com/technico.

*Stew's Hovercraft Page*, http://www.stewcam.com/hovercraft.html.

Kanoh, *Adaptive Control of Inverted Pendulum, Computrol*, vol. 2, (1983), pp. 69-75.

Yamafuji, *A Proposal for Modular-Structured Mobile Robots for Work that Principally Involve a Vehicle with Two Parallel Wheels, Automation Technology*, vol. 20, pp. 113-118 (1988).

Yamafuji & Kawamura, *Study of Postural and Driving Control of Coaxial Bicycle, Paper Read at Meeting of Japan Society of Mechanical Engineering (Series C)*, vol. 54, No. 501, (May, 1988), pp. 1114-1121.

Yamafuji et al., *Synchronous Steering Control of a Parallel Bicycle, Paper Read at Meeting of Japan Society of Mechanical Engineering (Series C)*, vol. 55, No. 513, (May, 1989), pp. 1229-1234.

Momoi & Yamafuji, *Motion Control of the Parallel Bicycle-Type Mobile Robot Composed of a Triple Inverted Pendulum, Paper Read at Meeting of Japan Society of Mechanical Engineering (Series C)*, vol. 57, No. 541, (Sep., 1991), pp. 154-159.

\* cited by examiner

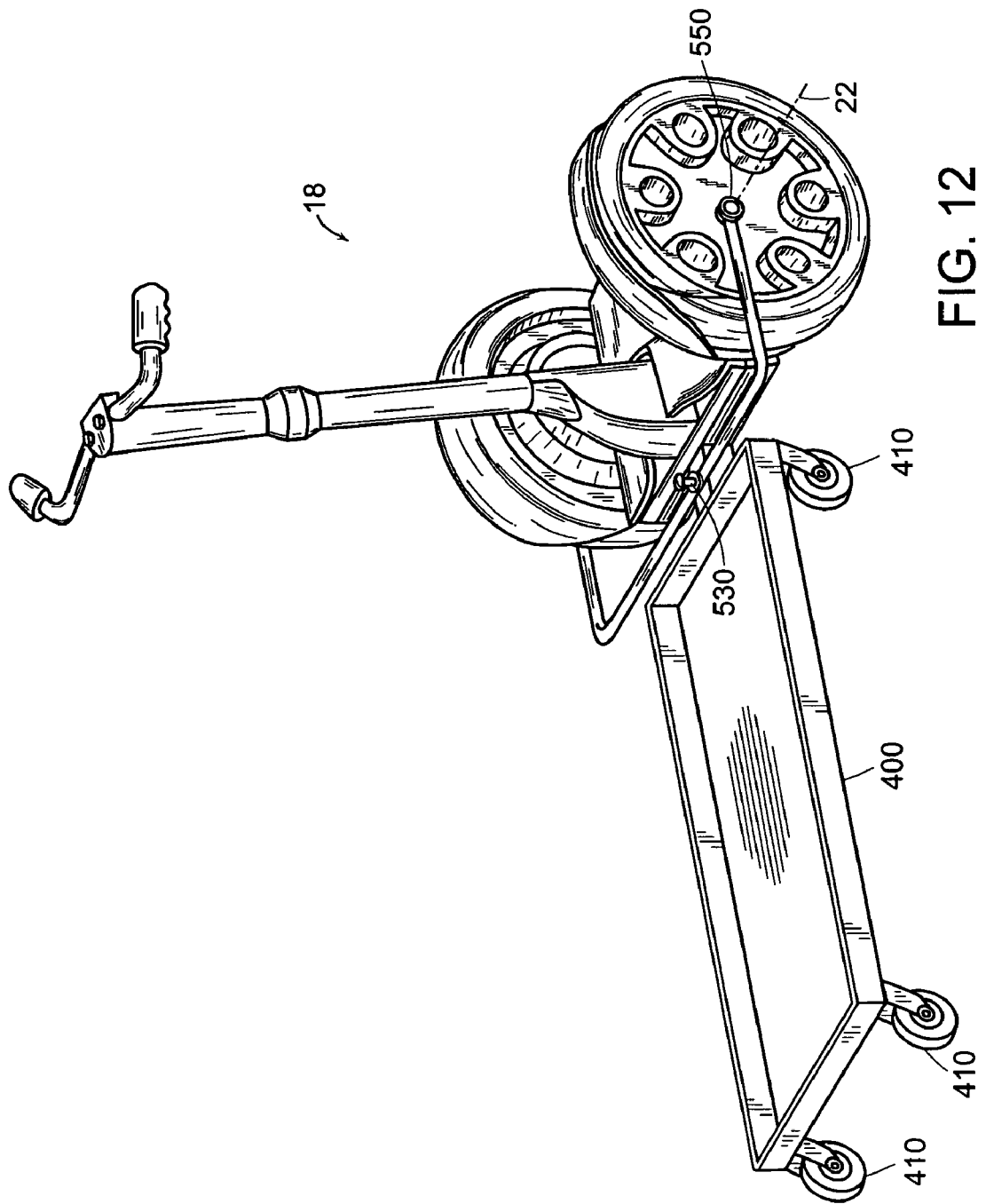

METHOD FOR ATTACHING A CARRIER TO A BALANCING TRANSPORTER

The present application is a continuation-in-part of copending application Ser. No. 10/164,333, filed Jun. 05, 2002 now abandoned which is a divisional application of application Ser. No. 09/516,384, filed Mar. 1, 2000 now U.S. Pat. No. 6,435,535 both of which are incorporated herein by reference in their entirety.

TECHNICAL FIELD

The present invention pertains to carriers, such as trailers, that may be attached to a balancing transporter and, more particularly, to an attachment mechanism that permits tilting action of the balancing transporter.

BACKGROUND

Dynamically balancing transporters refer to personal vehicles having a motion control system that actively maintains the stability of the transporter while the transporter is operating. The motion control system maintains the stability of the transporter by continuously sensing the orientation of the transporter, determining any corrective action to maintain stability, and commanding the wheel motors to make the corrective action. One such transporter is described in U.S. Pat. No. 6,302,230. Other dynamically balancing transporters are described in U.S. Pat. Nos. 5,701,965 and 5,971,091. Each of these patents is incorporated by reference herein in its entirety.

While control systems for balancing transporters can respond to certain extraneous torques, the torque presented by a trailer coupled to a balancing transporter in an arbitrary manner would vary nonlinearly with the orientation of the transporter and would present an obstacle to stable control of the transporter.

SUMMARY OF THE INVENTION

In embodiments of the present invention, a carrier is pivotally attached to a dynamically balancing transporter with a hitch. The axis of the hitch's pivotal attachment to the transporter is made coincident with the rotational axis of the transporter's wheels. Thus, the hitch exerts zero torque about the rotational axis of the wheel minimizing the impact to the dynamic balance of the transporter.

In a specific embodiment of the invention, the carrier is attached to the transporter such that the carrier is disposed behind the transporter. In another embodiment of the invention, the carrier is disposed in front of the transporter.

In another embodiment of the invention, a chain of balancing transporters and carriers is provided. A given transporter or carrier is pivotally attached to the carrier or transporter immediately in front of and behind the given transporter or carrier. The pivot axis of any connection to a balancing transporter in the chain is made coincident with the rotational axis of the transporter's wheels. In this way, the impact on the dynamic balance of each transporter is minimized.

BRIEF DESCRIPTION OF THE DRAWINGS

The foregoing features of the invention will be more readily understood by reference to the following detailed description, taken with reference to the accompanying drawings, in which:

FIG. 12 illustrates a carrier attached to the front of the transporter, according to an embodiment of the invention.

DETAILED DESCRIPTION OF SPECIFIC EMBODIMENTS

Figure 1:
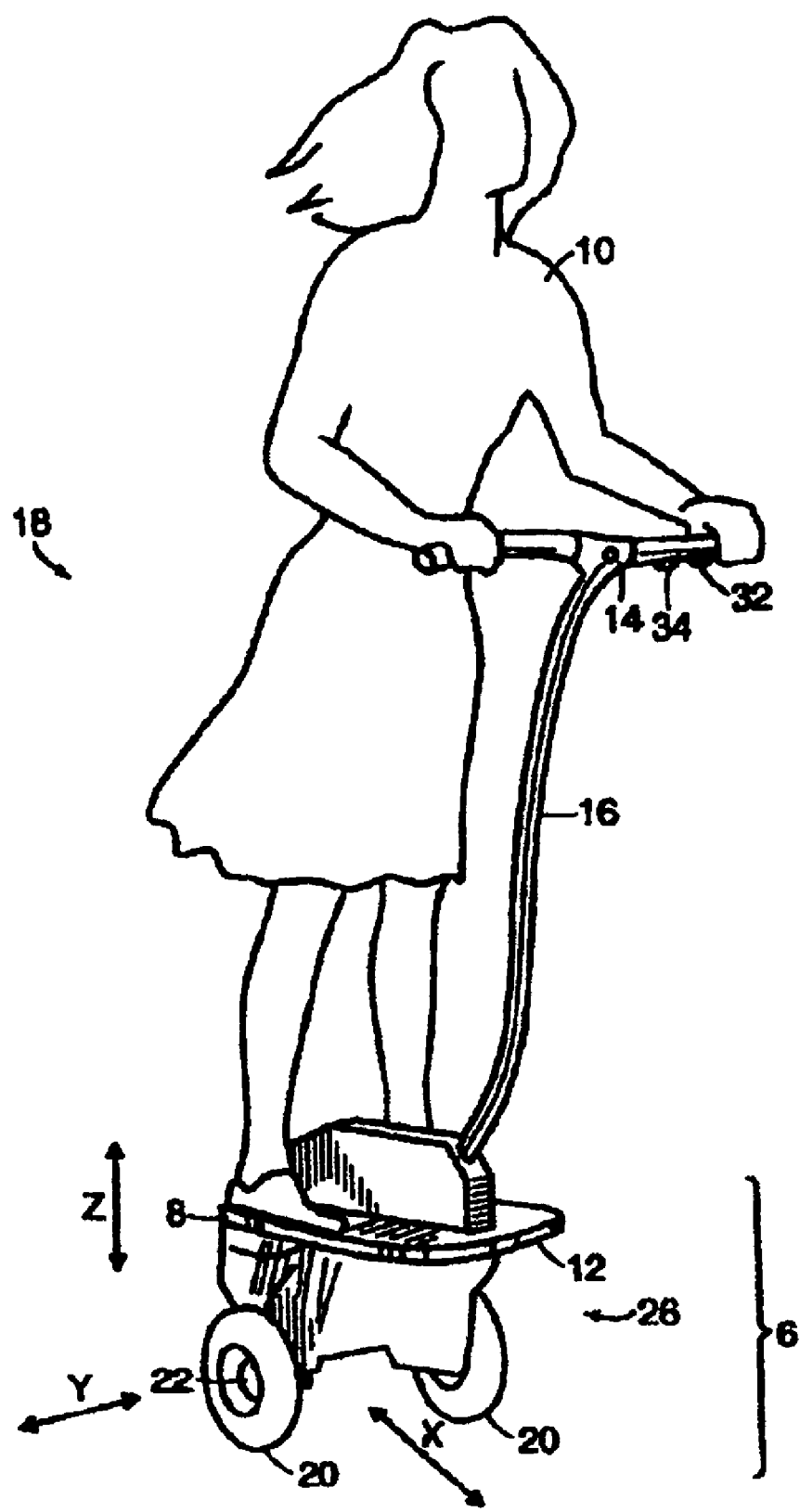
FIG. 1 is a perspective view of a personal transporter lacking a stable static position, in accordance with a preferred embodiment of the present invention, for supporting or conveying a subject who remains in a standing position thereon.

Definitions: as used in this description and the accompanying claims, the following terms shall have the meanings indicated, unless the context otherwise requires:

A "wheel" is any ground contacting member that is capable of rotation on an axis.

A "carrier" is any platform that is capable of carrying a payload which is suspended on at least one wheel. Carriers include, without limitation, trailers, carts (whether preceding or following an attached transporter) and even other transporters. A carrier may be powered or unpowered.

A "fore-aft plane" will mean a plane that is perpendicular to the rotational axis of a ground contacting element and that contains a vertical line thru a point of ground contact of the ground contacting element. The term "lateral plane" will mean a plane that is parallel to the rotational axis of a ground contacting element and that contains a vertical line thru a point of ground contact of the ground contacting element A "dynamically balancing (or balanced) transporter" will mean a transporter that lacks static stability in at least a fore-aft plane.

An alternative to operation of a statically stable transporter is that dynamic stability may be maintained by action of the user, as in the case of a bicycle or motorcycle or scooter, or, in accordance with embodiments of the present invention, by a control loop, as in the case of the human transporter described in U.S. Pat. No. 5,701,965. The invention may be implemented in a wide range of embodiments. A characteristic of many of these embodiments is the use of a pair of laterally disposed wheels to suspend the subject over the surface with respect to which the subject is being transported. The ground or other surface, such as a floor, over which a transporter in accordance with the invention is employed may be referred to generally herein as the "ground." The wheels are typically motor-driven. In many embodiments, the configuration in which the subject is suspended during locomotion lacks inherent stability at least a portion of the time with respect to a vertical in the fore-aft plane but is relatively stable with respect to a vertical in the lateral plane. Stability, as defined below, means that in response to a perturbation a stable device will tend towards its unperturbed state.

Motion Control of a Balancing Transporter

In various embodiments of a balancing transporter, fore-aft stability may be achieved by providing a control loop, in which one or more motors are included, for operation of a motorized drive in connection with the wheels. In these embodiments, the wheels are driven by the motorized drive in the control loop in such a way as to maintain, when the transporter is not in locomotion, the center of mass of the transporter above the region of contact of the wheels with the ground, regardless of disturbances and forces operative on the transporter.

A wheel typically has a "point" (actually, a region) of contact or tangency with the surface over which the transporter is traveling or standing. Due to the compliance of the wheel, the "point" of contact is actually an area, where the region of contact may also be referred to as a contact patch. The weight of the transporter is distributed over the contact region, giving rise to a distribution of pressures over the region, with the center of pressure displaced forward during forward motion. The distribution of pressures is a function both of the composition and structure of the wheel, the rotational velocity of the wheel, the torque applied to the wheel, and thus of the frictional forces acting on the wheel.

Figure 2:
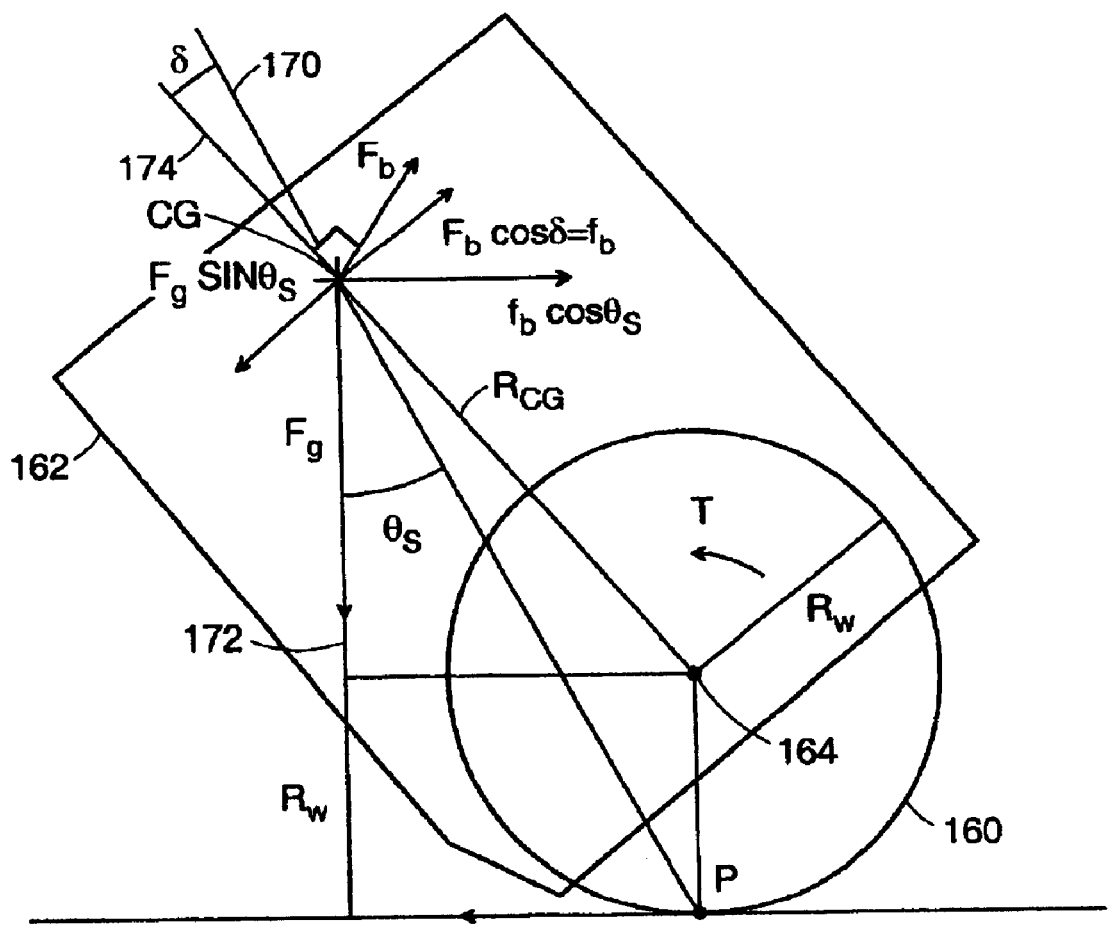
FIG. 2 shows an illustrative diagram of an idealized balancing transporter with a rigid wheel in motion at a constant velocity across a flat surface.

A force in the direction of motion is required to overcome rolling friction (and other frictional forces, including air resistance). Gravity may be used, in accordance with preferred embodiments of the invention, to provide a torque about the point of contact with the surface in a direction having a component in the sense of desired motion. Referring to FIG. 2, to illustrate these principles, a diagram is shown of the forces acting on a transporter that locomotes with constant velocity v on a single wheel over a flat surface. The principles now discussed may readily be generalized to operation on a sloped surface and to accommodate any other external forces that might be present. Wheel 160 of radius $R_w$ rotates with respect to chassis 162 about axle 164 and contacts the underlying surface at point P. For purposes of illustration only, it is assumed that wheel 160 contacts the surface at a point.

The wheel is driven with respect to the transporter by a torque T (supplied by a motor, for example) which in turn creates a reaction torque —T on the transporter. Since the torque acts about the axle 164, the reaction torque corresponds to a force $F_b$ acting at the center of gravity (CG) of the system, including the transporter and payload, where $F_b = T/R_{CG}$, where $R_{CG}$ is the distance between the axle and the CG of the system. The line 170 from the CG to point P is at an angle $\theta_s$ relative to the vertical 172.

The rolling friction, f, acting on the wheel at point P, is proportional to the velocity v of the rim of the wheel, with the proportionality expressed as $f = \mu v$. For constant velocity to be maintained, this force f must be exactly canceled. Consequently, with gravity providing the force, the condition that must be satisfied is:

$$F_b \cos \theta_s = f_b, \qquad \text{(Eqn. 1)}$$

where $f_b$ is the component of the reaction force acting transverse to axis 174 between the CG and point P. In order to prevent the transporter from falling, a stability condition must also exist, namely that no net force acts on the CG in a direction transverse to line 170, i.e., there is no net torque about the point of contact P during motion at constant velocity (i.e., in an inertial frame of reference where the point P is fixed). This condition may be expressed as:

$$F_g \sin \theta_s = f_b, \qquad \text{(Eqn. 2)}$$

where $F_g \sin \theta_s$ is the "tipping" component of gravity, and $f_b$ is the counter-tipping component of the reactive force on the transporter caused by wheel rotation ($f_b = F_b \cos \theta$), and where $\theta$ is the angle shown line 170 and line 174.

Eqns. 1 and 2 may be combined to yield $F_g \sin \theta_s \cos \theta_s = f = \mu v$, thus, in the limit of small angles (where $\sin \theta$ is approximately $\theta$), $$\theta_s = (\mu/F_g) v, \qquad \text{(Eqn. 3)}$$

showing that increasing velocity requires increased lean to overcome the effects of friction. Additionally, a control loop that imposes stability on the system will respond to an increased lean by increasing velocity of the system. While the preceding discussion assumed constant velocity, additional lean beyond that required to overcome the effects of friction will result in acceleration since an additional forward-directed force acts on the CG. Conversely, in order to achieve acceleration (or deceleration) of the transporter, additional leaning (forward or backward) must be provided in a manner discussed in further detail below.

FIG. 1 shows a simplified embodiment of a balancing transporter. A personal transporter is shown and designated generally by numeral 18. A subject 10 stands on a support platform 12 and holds a grip 14 on a handle 16 attached to the platform 12, so that the transporter 18 of this embodiment may be operated in a manner analogous to a scooter. A control loop may be provided so that leaning of the subject results in the application of torque to wheel 20 about axle 22 thereby causing an acceleration of the transporter. Transporter 18, however, is statically unstable, and, absent operation of the control loop to maintain dynamic stability, subject 10 will no longer be supported in a standing position. Different numbers of wheels may advantageously be used in various embodiments of the invention as particularly suited to varying applications. Thus, as described in greater detail below, the number of wheels may be any number equal to, or greater than, one. For many applications, the dimensions of platform 12, and indeed of the entire ground-contacting module, designated generally by numeral 6, are advantageously comparable to the dimensions of the footprint or shoulder width of user 10. Thus transporter 18 may advantageously be used as a mobile work platform or a recreational transporter such as a golf cart, or as a delivery transporter.

Operation of the balancing transporter will be described with reference to the set of coordinate axes shown in FIG. 1. Gravity defines the vertical axis z, while the axis coincident with the wheel axis 22 may be used to define a lateral axis y, and a fore-aft axis x is defined by the forward direction of motion of the transporter. Directions parallel to the axes x and y are called the fore-aft and lateral directions respectively. It can be seen that the transporter, when relying on the pair of wheels 20 for contacting the ground, is inherently unstable with respect to a vertical in the fore-aft direction, but is relatively stable with respect to a vertical in the lateral direction. In other embodiments of the invention described below, the transporter may also be unstable with respect to yaw about the z axis.

Figure 3:
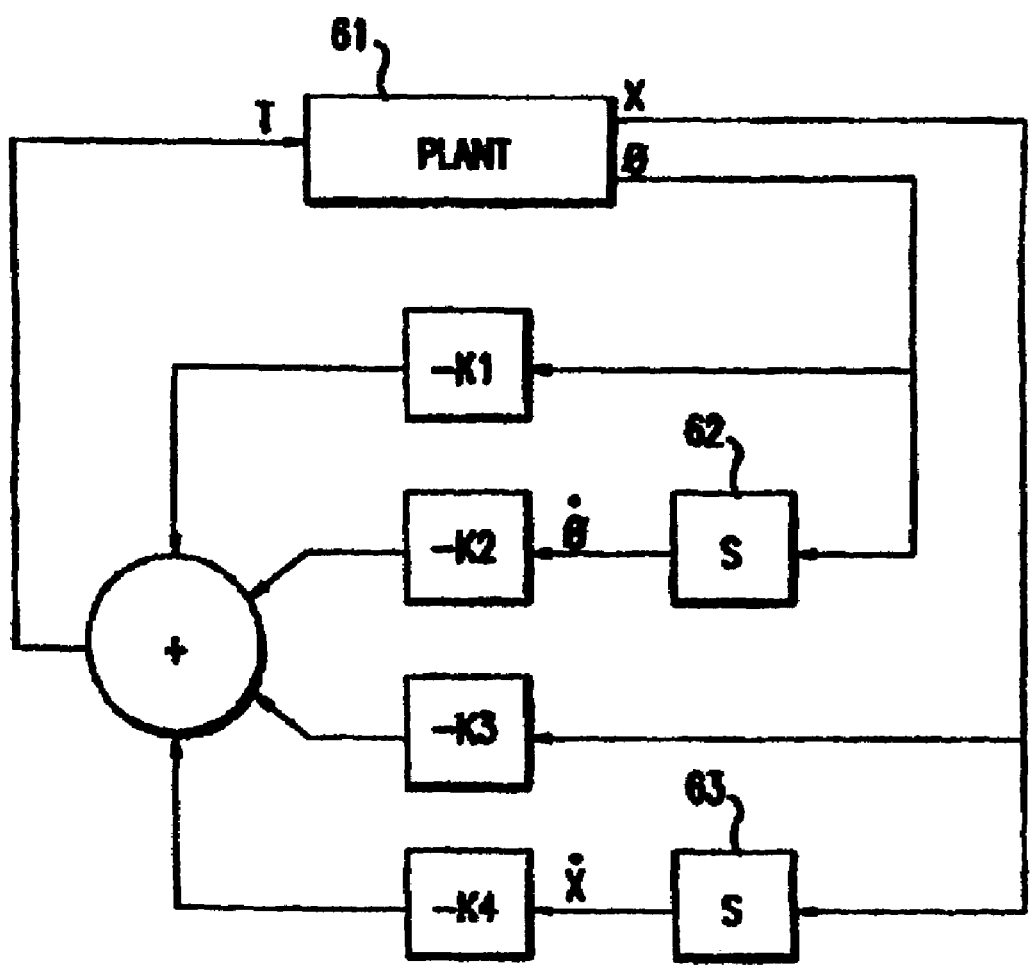
FIG. 3 illustrates the control strategy for a simplified version of FIG. 1 to achieve balance using wheel torque.

A simplified control algorithm for achieving balance in the embodiment of the invention according to FIG. 1 when the wheels are active for locomotion is shown in the block diagram of FIG. 3. The plant 61 is equivalent to the equations of motion of a system with a ground contacting module driven by a single motor, before the control loop is applied. T identifies the wheel torque. The remaining portion of the figure is the control used to achieve balance. The boxes 62 and 63 indicate differentiation. To achieve dynamic control to insure stability of the system, and to keep the system in the neighborhood of a reference point on the surface, the wheel torque T in this embodiment is governed by the following simplified control equation:

$$T = K_1(\theta - \theta_0) + K_2(\dot{\theta} - \dot{\theta}_0) + K_3(x - x_0) + K_4(\dot{x} - \dot{x}_0) \quad \text{(Eqn. 4)}$$

where:

T denotes a torque applied to a wheel about its axis of rotation;

$\theta$ is a quantity corresponding to the lean of the entire system about the ground contact, with $\theta_0$ representing the magnitude of a system pitch offset, all as discussed in detail below;

x identifies the fore-aft displacement along the surface relative to a fiducial reference point, with $x_0$ representing the magnitude of a specified fiducial reference offset;

a dot over a character denotes a variable differentiated with respect to time; and a subscripted variable denotes a specified offset that may be input into the system as described below; and $K_1$, $K_2$, $K_3$, and $K_4$ are gain coefficients that may be configured, either in design of the system or in real-time, on the basis of a current operating mode and operating conditions as well as preferences of a user. The gain coefficients may be of a positive, negative, or zero magnitude, affecting thereby the mode of operation of the vehicle, as discussed below. The gains $K_1$, $K_2$, $K_3$, and $K_4$ are dependent upon the physical parameters of the system and other effects such as gravity. The simplified control algorithm of FIG. 3 maintains balance and also proximity to the reference point on the surface in the presence of disturbances such as changes to the system's center of mass with respect to the reference point on the surface due to body motion of the subject or contact with other persons or objects. It should be noted that the amplifier control may be configured to control motor current (in which case torque T is commanded, as shown in FIG. 3) or, alternatively, the voltage applied to the motor may be controlled, in which case the commanded parameter is velocity.

The effect of $\theta_0$ in the above control equation (Eqn. 4) is to produce a specified offset $\theta_0$ from the non-pitched position where $\theta = 0$. Adjustment of $\theta_0$ will adjust the vehicle's offset from a non-pitched position. As discussed in further detail below, in various embodiments, pitch offset may be adjusted by the user, for example, by means of a thumb wheel 32, shown in FIG. 1. An adjustable pitch offset is useful under a variety of circumstances. For example, when operating the vehicle on an incline, it may be desirable for the operator to stand erect with respect to gravity when the vehicle is stationary or moving at a uniform rate. On an upward incline, a forward torque on the wheels is required in order to keep the wheels in place. This requires that the user push the handle further forward, requiring that the user assume an awkward position. Conversely, on a downward incline, the handle must be drawn back in order to remain stationary. Under these circumstances, $\theta_0$ may advantageously be manually offset to allow control with respect to a stationary pitch comfortable to the user.

The size of $K_3$ will determine the extent to which the transporter will seek to return to a given location. With a non-zero $K_3$, the effect of $x_0$ is to produce a specified offset $-x_0$ from the fiducial reference by which x is measured. When $K_3$ is zero, the transporter has no bias to return to a given location. The consequence of this is that if the transporter is caused to lean in a forward direction, the transporter will move in a forward direction, thereby maintaining balance. Such a configuration is discussed further below.

The term "lean" is often used with respect to a system balanced on a single point of a perfectly rigid member. In that case, the point (or line) of contact between the member and the underlying surface has zero theoretical width. In that case, furthermore, lean may refer to a quantity that expresses the orientation with respect to the vertical (i.e., an imaginary line passing through the center of the earth) of a line from the center of gravity (CG) of the system through the theoretical line of ground contact of the wheel. While recognizing, as discussed above, that an actual wheel is not perfectly rigid, the term "lean" is used herein in the common sense of a theoretical limit of a rigid wheel. The term "system" refers to all mass caused to move due to motion of the wheels with respect to the surface over which the transporter is moving.

"Stability" as used in this description and in any appended claims refers to the mechanical condition of an operating position with respect to which the system will naturally return if the system is perturbed away from the operating position in any respect.

Acceleration of the transporter may be established by system lean. For example, to achieve forward acceleration of the transporter by forward system lean; the center of gravity of the system (transporter and payload) would be placed forward of the center of the pressure distribution of the contact region where the wheels contact the ground—the more the lean, the more the acceleration. Thus, furthermore, it can be seen that leaning, in conjunction with gravity and friction, determines acceleration (positive or negative) of the system. In this manner, if the transporter is moving forward, pitching the system back will achieve braking. Because the transporter must overcome friction, there is typically some system lean when the transporter is moving at constant velocity over level ground. In other words, looking at the torque on the transporter caused by gravity and the torque caused by all other external forces, the torque applied by the motorized drive is adjusted so that the net torque from all these sources produces a desired acceleration.

Carrier Attachment to a Balancing Transporter

As described above, dynamic stability for a transporter can be maintained by applying a torque to a wheel about its axis of rotation. Attachment of a carrier to the transporter may be advantageous to increase the payload carrying capacity of the transporter. Such attached carriers must not impact substantially the dynamic stability of the transporter. Generally speaking, any component of a force exerted by the carrier on the transporter that is transverse to the vertical direction must be minimized or particularly accounted for by the control law.

In an embodiment of the present invention a carrier is pivotally attached to a dynamically balancing transporter with a hitch. The axis of the hitch's pivotal attachment to the transporter is made coincident with the rotational axis of the transporter's wheels. The hitch exerts zero torque about the rotational axis of the wheel thereby minimizing the impact to the dynamic balance and control of the transporter.

Figure 4:
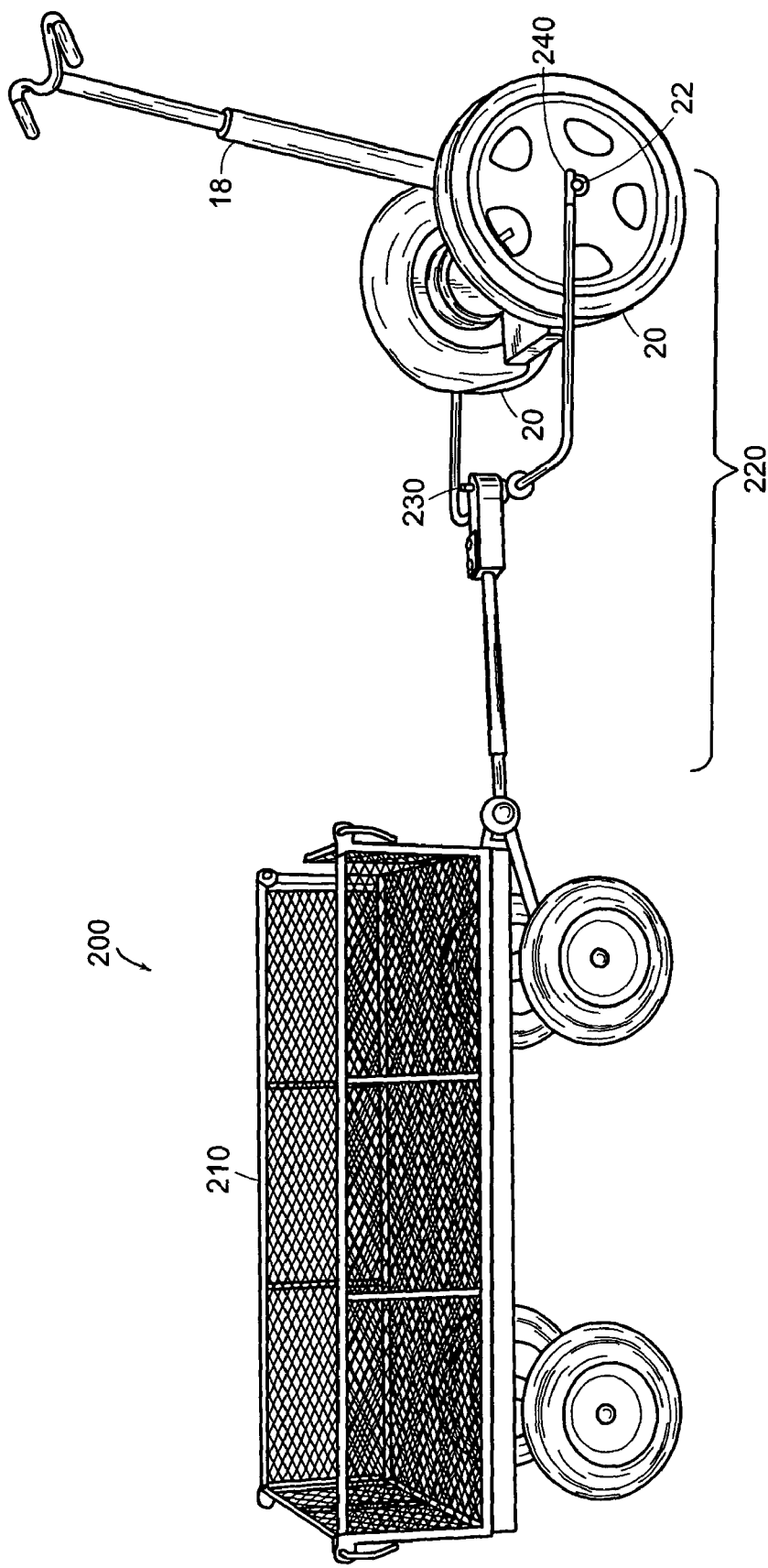
FIG. 4 shows a transporter with attached trailer according to an embodiment of the invention.
Figure 5:
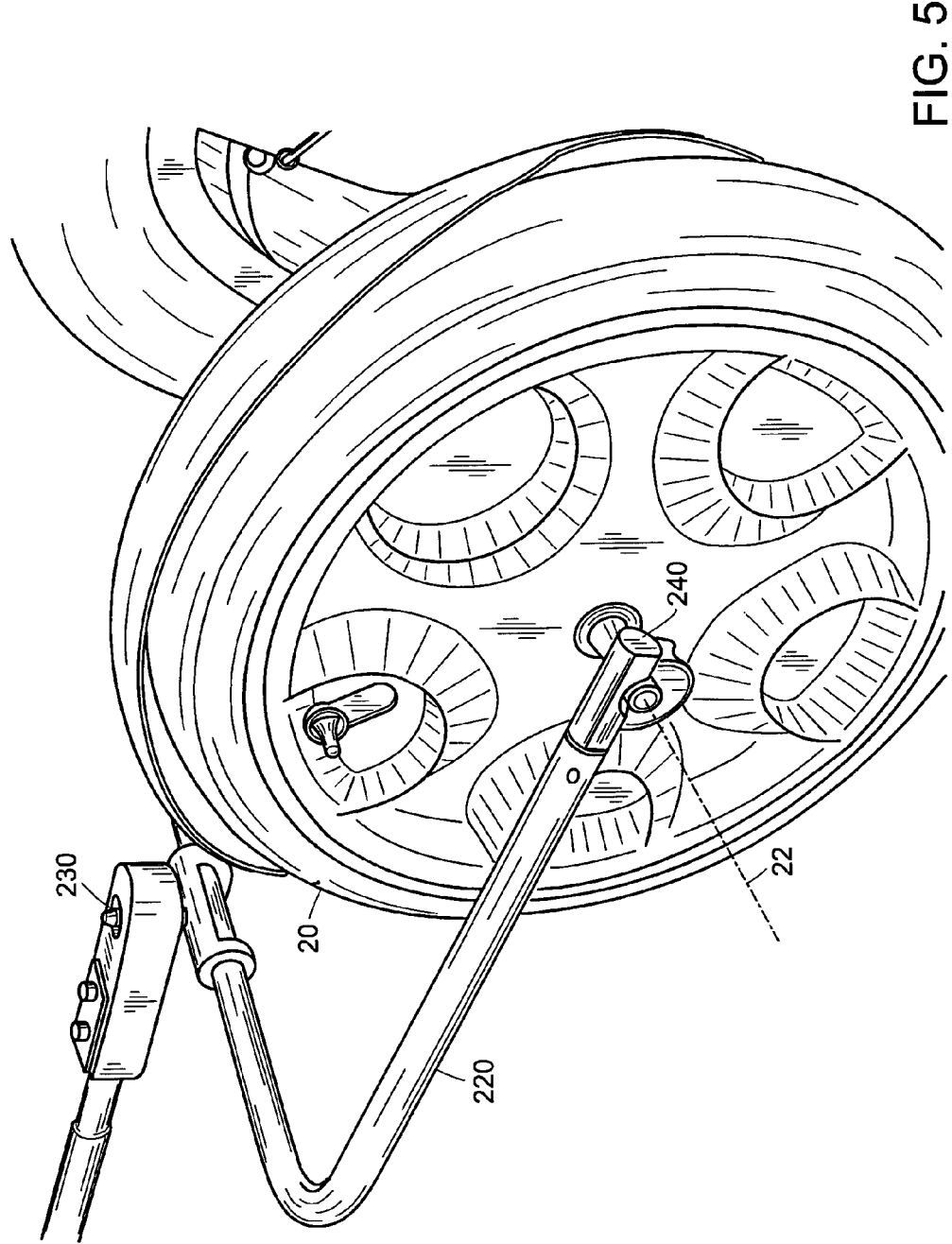
FIG. 5 shows a view of the trailer hitch attachment for one wheel of the embodiment of FIG. 4.

Referring to FIG. 4, in an embodiment of the present invention, a system 200, is provided that includes a dynamically balancing transporter 18 and an attached trailer 210. The trailer 210 is equipped with a hitch 220 to attach the trailer to the transporter. The hitch 220 includes a "lateral" pivot 230 to allow lateral movement of the transporter relative to the trailer. The hitch also includes "fore-aft" pivots 240 (shown for one of the transporter's wheels 20) to allow fore-aft movement of the transporter relative to the trailer. The axis of each fore-aft pivot is coincident with the rotational axis 22 of the wheels 20. This method of attachment ensures that the trailer coupling to the transporter exerts no torque about the rotational axis of the wheels, regardless of the relative fore-aft orientation of the trailer with respect to the transporter. Thus, dynamic balance of the transporter is unaffected by the trailer, as can be seen from eqn. 4. The combination of transporter and trailer allows larger payloads to be carried over a surface than if the transporter was used alone. FIG. 5 shows a detailed view of the trailer hitch attachment for one wheel of the embodiment of FIG. 4.

Figure 6:
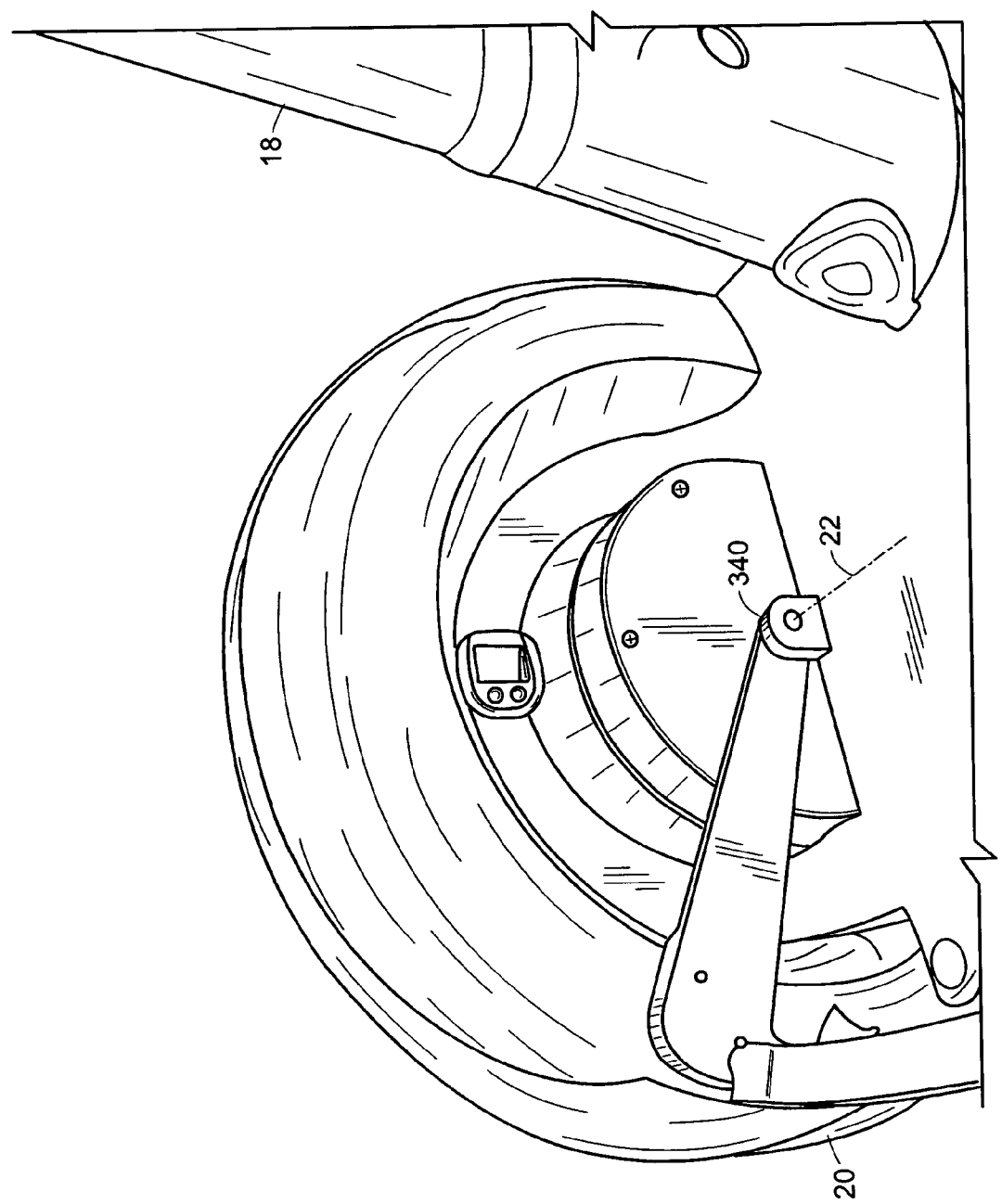
FIG. 6 illustrates trailer hitch attachment inboard of the transporter wheels.
Figure 7:
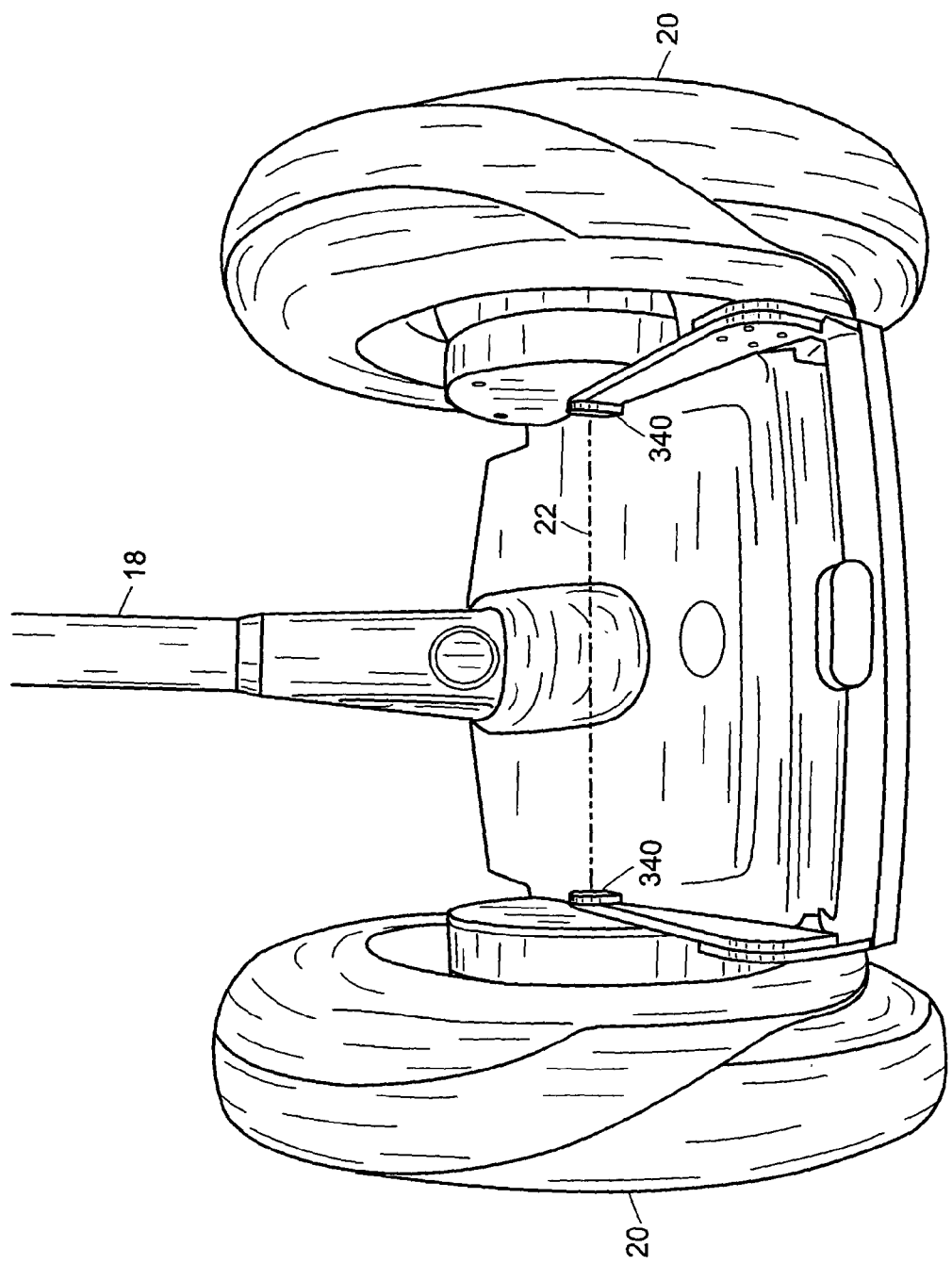
FIG. 7 shows a front-facing view of the rear of the transporter with the trailer hitch attached.

Referring to FIG. 6, in a specific embodiment of the present invention, the fore-aft pivots 340 of the trailer hitch, shown for one wheel, are attached to the transporter 18 inboard of the transporter wheels 20 (not shown). The axes of the fore-aft pivots are again coincident with the rotational axis 22 of the respective wheel. FIG. 7 shows a front-facing view of the rear of the transporter with the trailer hitch attached. The hitch connection to the trailer is omitted for clarity. This embodiment of the invention advantageously minimizes the combined width of the transporter plus trailer hitch.

Figure 8:
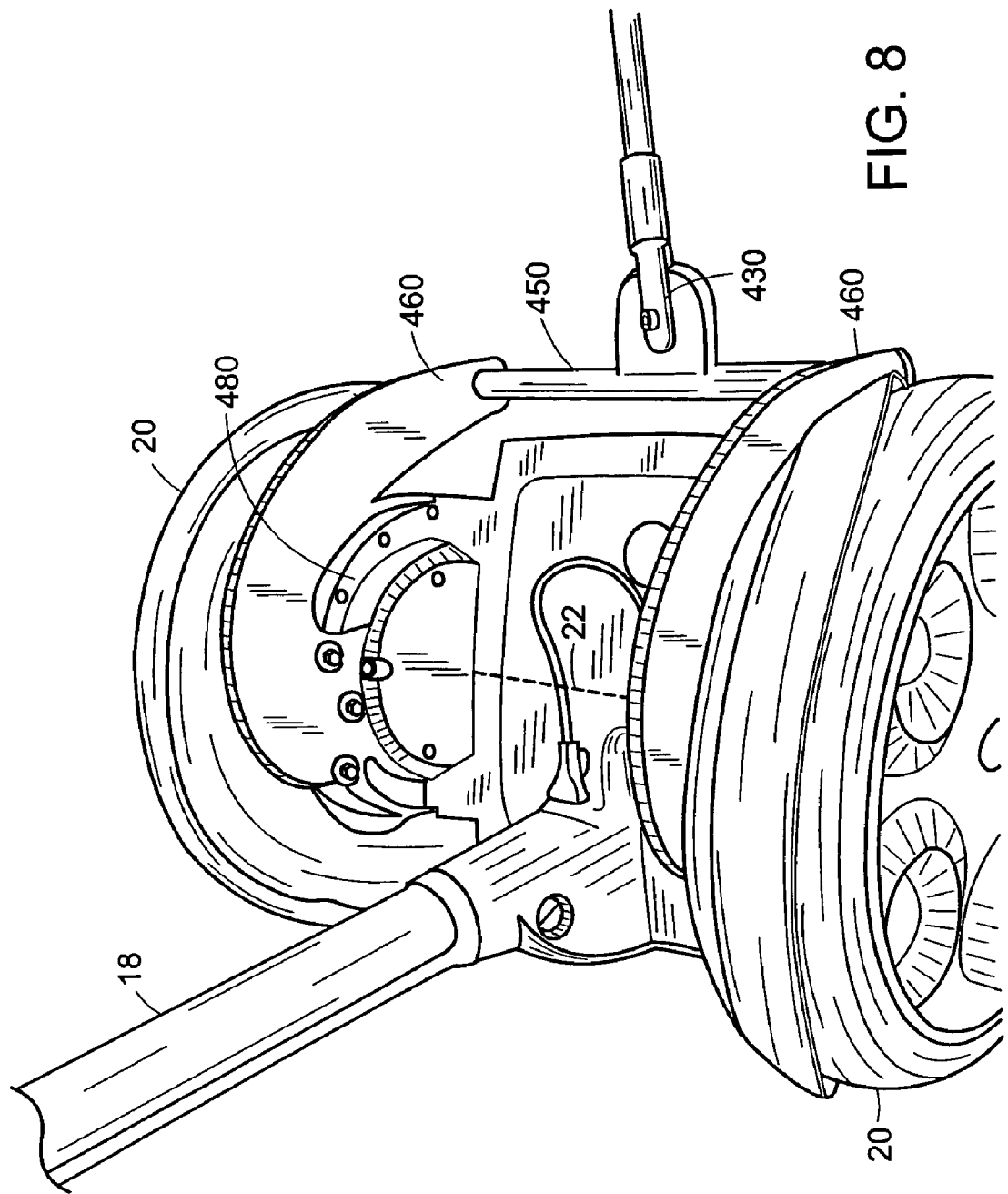
FIG. 8 shows a transporter with a trailer hitch attached according to an embodiment of the invention.
Figure 9:
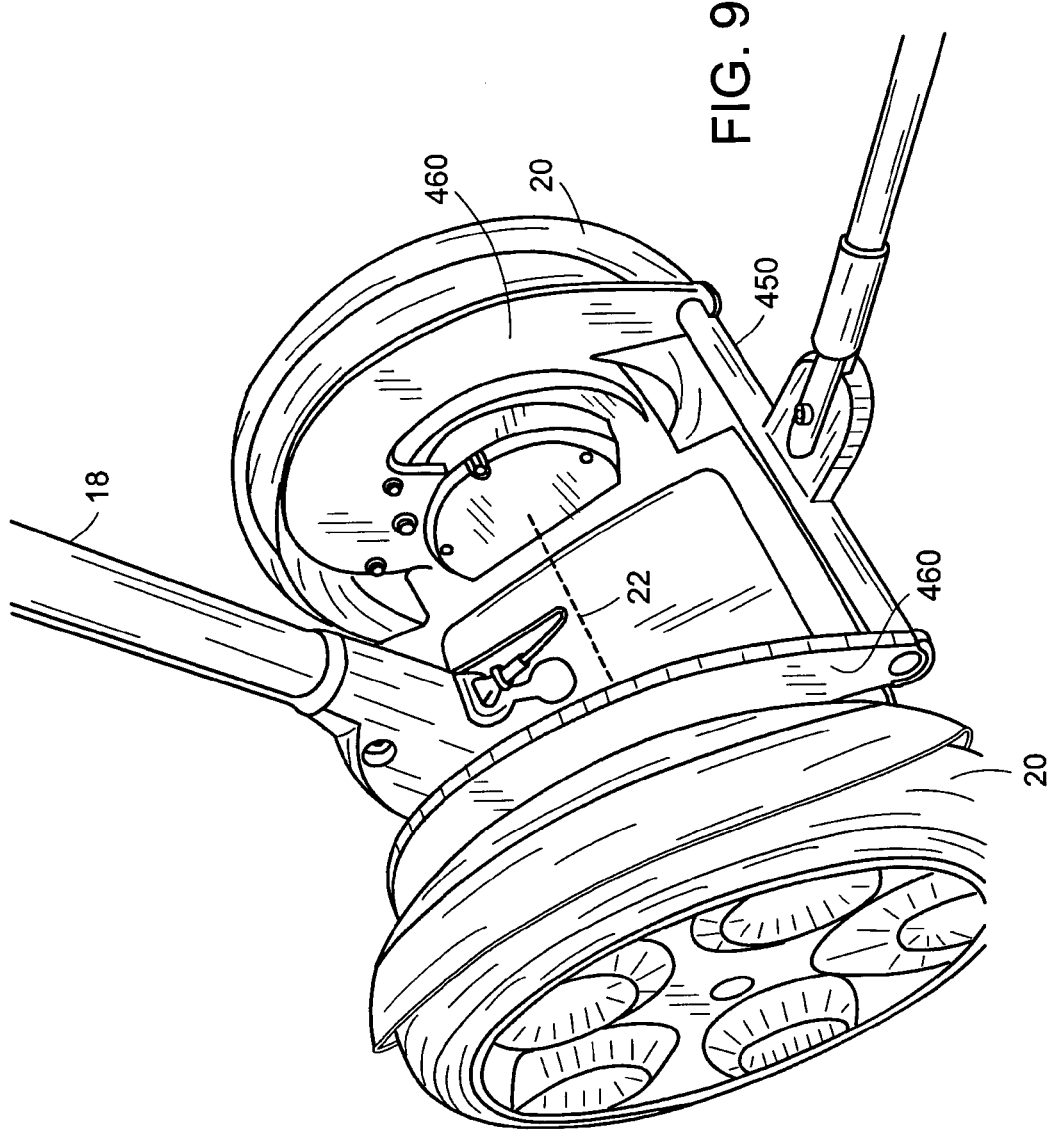
FIG. 9 shows that the transporter can rotate freely in the aft direction with the trailer hitch attached.
Figure 10:
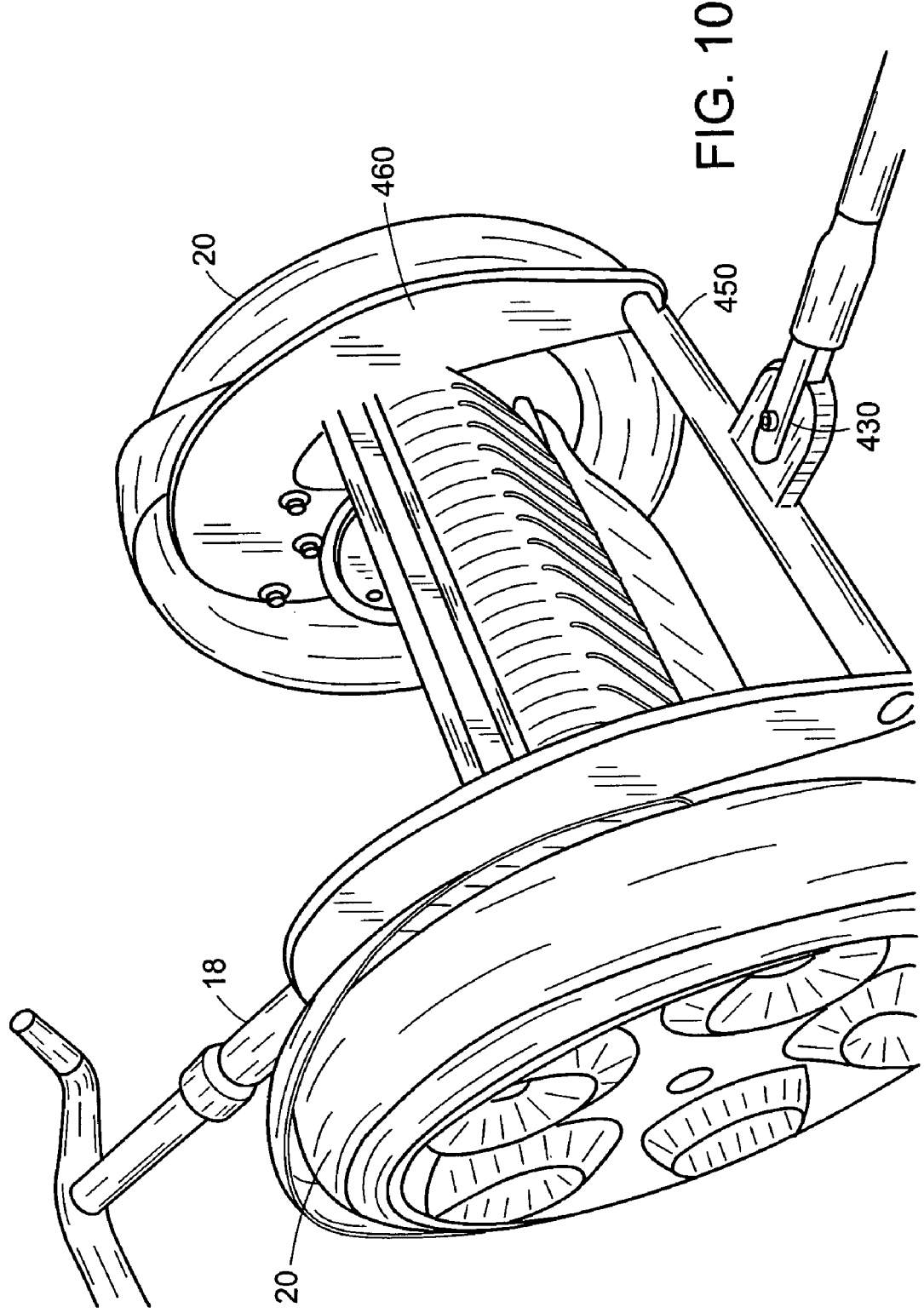
FIG. 10 shows that the transporter can rotate freely in the forward direction with the trailer hitch attached, in the embodiment shown in FIG. 8.
Figure 11:
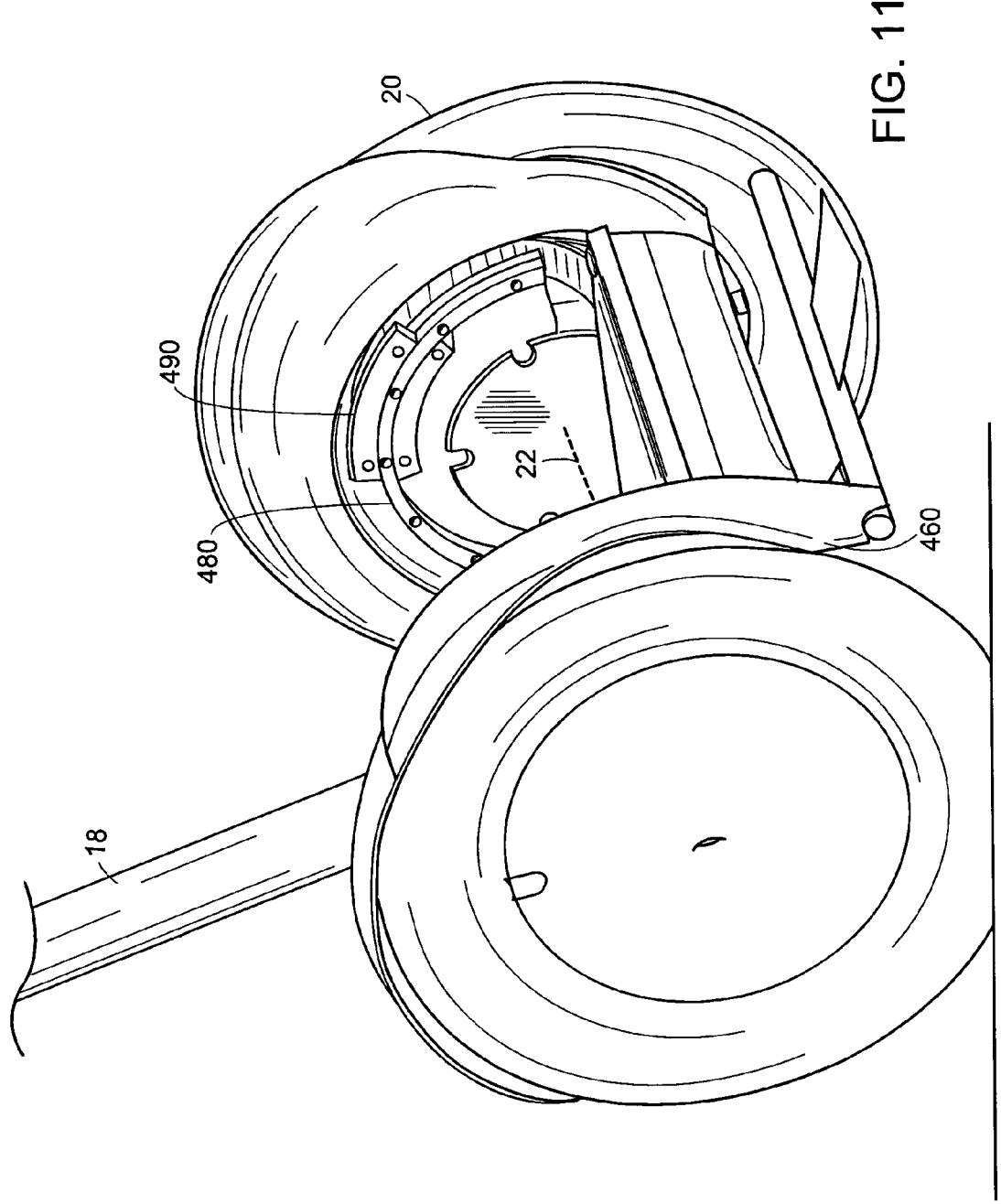
FIG. 11 illustrates a method of attaching the hitch arms of the embodiment shown in of FIGS. 8–10 to the transporter.

In another embodiment of the invention, the trailer hitch is attached to the transporter inboard of the transporter's wheels, as shown in FIG. 8. Lateral pivot 430 allows lateral movement with respect to transporter 18 for a trailer attached to the hitch. A horizontal bar 450 attaches to the lateral pivot 430 and attaches rotatably to each of two hitch arms 460. The hitch arms 460 are shaped as an arc. The hitch arms may be pivotally attached to the transporter 18 at the wheel transmission, as shown in FIGS. 8–10. As shown in FIG. 11, each hitch arm may be attached to a track 480 via a slide assembly 490. The slide assembly includes ball bearings or the equivalent to allow the hitch arm to slide freely on the track. (The hitch arm is not shown for clarity.) Track 470 is circular with the center of the track at the rotational axis 22 of the wheel. This design ensures that the force of the trailer hitch is over the transporter's wheels at all times, exerting zero torque about the rotational axis of the wheels. Note, that as illustrated in FIGS. 9 and 10, the arcuate shape of the hitch arms together with the pivots at each end of the arms allow the transporter to rotate freely fore and aft of the horizontal with the trailer attached. In a further specific embodiment of the invention, each hitch arm may be attached at the transporter 18 to a fore-aft pivot with the axis of rotation of the fore-aft pivot coincident with the rotational axis of the wheels.

In other embodiments of the present invention, any number of carriers or balancing transporters may be attached to each other in a chain of carriers or transporters. The attachment of one transporter or carrier to the adjacent transporter or carrier is with a hitch that includes a fore-aft pivot. At each pivotal hitch connection to a balancing transporter, the axis of the fore-aft pivot is made coincident with the rotational axis of the transporter's wheels. This attachment scheme minimizes the effect of the attached carrier or transporter on the balance and control of the transporter to which it is attached.

In another embodiment of the invention, as shown in FIG. 12, a carrier 400 is attached to a balancing transporter 18 such that the carrier travels in front of the transporter. The carrier is pivotally attached to the transporter with a carrier hitch 420 that can be similar to any of the trailer hitches described above. The carrier hitch may be attached either inboard or outboard of the transporter wheels. The axis of each carrier hitch fore-aft pivot 550 is coincident with the axis of rotation 22 of the wheels. Lateral pivot 530 allows lateral movement with respect to transporter 18 for the carrier attached to the hitch. The carrier may be suspended on any combination of wheels including a single wheel. For example, the carrier may include caster wheels 410 in front and rear as shown in FIG. 11 or may include a single caster wheel in the center of the carrier end nearest the transporter. Alternatively, the carrier may include caster wheels I front and may be suspended by the hitch in the rear.

The described embodiments of the invention are intended to be merely exemplary and numerous variations and modifications will be apparent to those skilled in the art. While the preceding embodiments have been described in terms of use of one or more Wheels as a ground contacting element for the transporter and for the carrier(s), other types of ground contacting elements may be employed in embodiments of the invention. The various types of ground contacting elements may be mixed in any combination in various embodiments of the invention. These and other variations and modifications are intended to be within the scope of the present invention as defined in the appended claims.

What is claimed is:

1. A method for governing motion of a combination of a dynamically balanced transporter and a carrier, the method comprising:

a. coupling the carrier to the dynamically balanced transporter with a pivot, the pivot characterized by a pivot axis;

b. tilting the transporter in a direction of desired motion; and c. governing motion of the combination of transporter and carrier in response to the tilt of the transporter.

2. A method according to claim 1, wherein the carrier is a second transporter.

3. A method according to claim 1, further including:

d. coupling an additional carrier to the carrier.

4. A method according to claim 3, wherein at least one of the carrier and the additional carrier is a transporter.

5. A method according to claim 1, wherein the transporter includes a platform and at least one ground-contacting element, each ground contacting element rotatably attached to the platform about a rotation axis and wherein the pivot axis is coincident with the rotation axis.

6. A method according to claim 5, wherein coupling the carrier includes attaching the carrier such that the carrier rides behind the transporter.

7. A method according to claim 5, wherein coupling the carrier includes attaching the carrier such that the carrier rides in front of the transporter.

8. A method according to claim 5, wherein the transporter includes at least two laterally disposed ground contacting elements and coupling the carrier includes attaching the carrier such that at least one pivot is disposed between two ground contacting elements.

\* \* \* \* \*